(12) United States Patent
Tao et al.

(10) Patent No.: US 6,550,934 B2
(45) Date of Patent: Apr. 22, 2003

(54) LIGHT EMITTING DEVICE

(75) Inventors: Hiroaki Tao, Tsukuba (JP); Tetsuya Nakazato, Tsukuba (JP)

(73) Assignee: Secretary of Agency of Industrial Science and Technology (JP)

( * ) Notice: Subject to any disclaimer, the term of this patent is extended or adjusted under 35 U.S.C. 154(b) by 0 days.

(21) Appl. No.: 09/739,680

(22) Filed: Dec. 20, 2000

(65) Prior Publication Data

US 2003/0035282 A1 Feb. 20, 2003

(30) Foreign Application Priority Data

Jul. 31, 2000 (JP) ........................................ 2000-231995

(51) Int. Cl.$^7$ .................................................. H01S 3/00
(52) U.S. Cl. ........................... 362/260; 362/84; 372/69; 372/34
(58) Field of Search .................... 362/84, 260, 217; 372/69, 70, 71, 72, 34, 75, 55, 92

(56) References Cited

U.S. PATENT DOCUMENTS

| | | | | |
|---|---|---|---|---|
| 3,659,225 A | * | 4/1972 | Furumoto et al. ............. | 372/69 |
| 3,770,338 A | | 11/1973 | Helmuth ...................... | 350/96 |
| 4,087,763 A | * | 5/1978 | George et al. ........ | 331/94.5 PE |
| 4,232,276 A | * | 11/1980 | Iwata ........................... | 372/70 |
| 4,249,143 A | * | 2/1981 | Eden ........................... | 372/69 |
| 4,752,937 A | * | 6/1988 | Gorisch et al. ............... | 372/88 |
| 4,757,427 A | | 7/1988 | Oostvogels et al. .......... | 362/32 |
| 4,815,091 A | * | 3/1989 | Hara et al. .................... | 372/56 |
| 4,991,180 A | * | 2/1991 | Yamaguchi et al. .......... | 372/56 |
| 5,005,182 A | * | 4/1991 | Muckerheide ............... | 372/72 |
| 5,117,434 A | * | 5/1992 | Oohashi et al. ............... | 372/56 |
| 5,224,110 A | * | 6/1993 | Hudson ........................ | 372/32 |

FOREIGN PATENT DOCUMENTS

WO          01/27962          10/2000

* cited by examiner

*Primary Examiner*—Sandra O'Shea
*Assistant Examiner*—Bao Truong
(74) *Attorney, Agent, or Firm*—Lorusso, Loud & Kelly

(57) ABSTRACT

A light emitting device having a lamp for producing light when supplied with electric current, and an elongated optical material having a portion disposed within the lamp and one end located outside the lamp and serving as an outlet of emitted light. The optical material may be (a) a light transmissive, fluorescent or phosphorescent adapted to emit fluorescent or phosphorescent light upon being excited by irradiation with the light of the lamp so that the fluorescent or phosphorescent light is transmitted to the outlet, (b) a rod transparent to the light of the lamp so that the light from the lamp entering the rod is transmitted to the outlet, or (c) a light transmissive, laser generating optical material adapted to emit a laser beam upon being excited with the light of the lamp so that the laser beam is transmitted to the outlet.

9 Claims, 3 Drawing Sheets

LIGHT EMITTING DEVICE

BACKGROUND OF THE INVENTION

This invention relates generally to a light emitting device and, more specifically, to a device adapted to emit condensed light from a lamp, condensed fluorescent or phosphorescent light generated by irradiation with a lamp or a laser beam generated by excitation with a flash lamp.

Known devices for collecting light from a lamp on an optical material include (a) a device having a helical lamp disposed around the optical material, (b) a device having a elliptic reflection mirror disposed such that a lamp and the optical material are positioned at the two focal points thereof, respectively, and (c) a device with a pair of elliptic reflection mirrors disposed such that the optical material is located at the confocal point thereof with two lamps being located at the other focal points.

With the device (a), only part of the light from the helical lamp is utilized. Further, the lamp is apt to be broken upon collision with a hard thing. Moreover, it is not easy to exchange the lamp. The devices (b) and (c) become unavoidably large in size and complicated. The known devices (a)–(c) have also a problem that the space between the lamp and the optical material should be kept oxygen-free when vacuum ultraviolet rays are used.

SUMMARY OF THE INVENTION

It is an object of the present invention to provide a device which can emit condensed light from a lamp, condensed fluorescent or phosphorescent light generated by irradiation with a lamp or a laser beam generated by excitation with a flash lamp.

Another object of the present invention is to provide a device of the above-mentioned type which is simple and compact in construction, easy to handle and low in manufacturing costs.

In accomplishing the foregoing objects, there is provided in accordance with one aspect of the present invention a light emitting device comprising:

a lamp for producing light when supplied with electric current; and an elongated, light transmissive, fluorescent or phosphorescent optical material having a portion disposed within said lamp and one end located outside said lamp, so that said optical material emits fluorescent or phosphorescent light upon being excited by irradiation with the light of said lamp, with said fluorescent or phosphorescent light being transmitted to said one end.

In another aspect, the present invention provides a light emitting device comprising:

a lamp for producing light when supplied with electric current; and an elongated, light transmissive optical material transparent to the light of said lamp and having a portion disposed within said lamp and one end located outside said lamp, so that the light of said lamp entering said optical material is transmitted to said one end.

The present invention also provides a light emitting device comprising:

a lamp for producing light when supplied with electric current; and an elongated, light transmissive, laser generating optical material having a portion disposed within said lamp and one end located outside said lamp, so that said optical material emits a laser beam upon being excited with the light of said lamp, with said laser beam being transmitted to said one end.

BRIEF DESCRIPTION OF THE DRAWINGS

Other objects, features and advantages of the present invention will become apparent from the detailed description of the preferred embodiments which follows, when considered in light of the accompanying drawings, in which.

DETAILED DESCRIPTION OF THE PREFERRED EMBODIMENTS OF THE INVENTION

Figure 1:
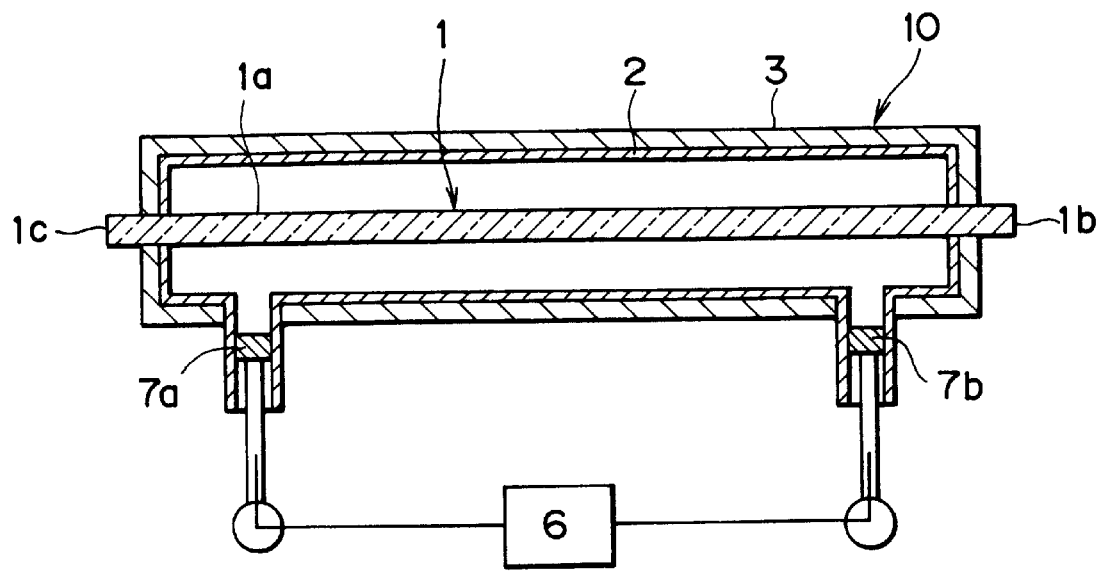
FIGS. 1–3 are cross-sectional elevational views diagrammatically illustrating embodiments of light emitting devices according to the present invention.

Referring now to FIG. 1, a light emitting device according to the present invention has a lamp designated generally as 10 for producing light when supplied with electric current. The lamp 10 may be of a well-known type such as a mercury vapor lamp for producing UV light, an arc lamp for producing UV and visible light or a flash lamp for producing a laser beam.

Figure 5:
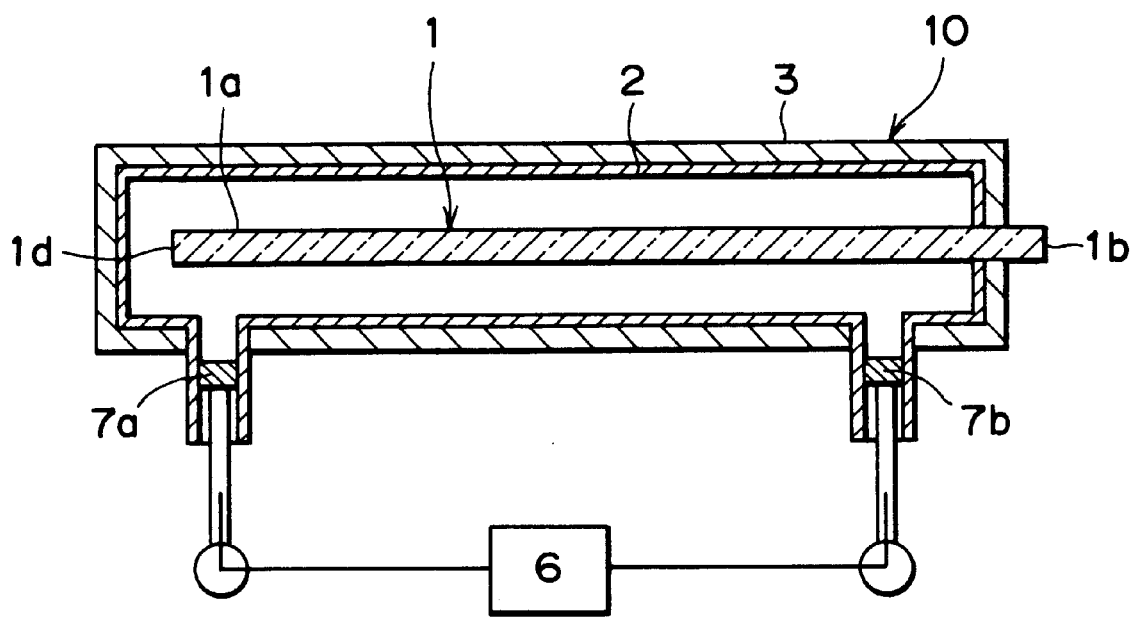
FIG. 5 is a cross-sectional elevational view, similar to FIGS. 1–3, diagrammatically illustrating a further embodiment of a light emitting device according to the present invention.

An elongated optical material 1 is secured to and extends into the lamp 10. The optical material 1, which will be described in detail hereinafter, has a portion 1a disposed within the lamp 10 and both ends 1b and 1c located outside the lamp 10. At least one of the both ends 1b and 1c serves as an outlet of emitted light. When, for example, only the end 1b is used as the light emission outlet, the other end 1c is provided with a light reflector such as a metal foil or a metal deposition layer. If desired, the optical material 1 can protrude only from one end of the lamp 10 as shown in FIG. 5. In this case, the end surface 1d of the optical material 1 located within the lamp 10 should be provided with a light reflector.

The optical material 1 may be in any desired shape such as a straight, curved or helical rod or fiber which may be flexible if desired. When the optical material 1 is of a type which by itself does not retain its shape (e.g. when the material 1 is a soft solid, a gas or a liquid), or when the optical material is damaged upon contact with a gas (e.g. a discharge gas) contained in the lamp 10, the optical material 1 may be accommodated and retained in a transparent pipe or container.

Figure 2:
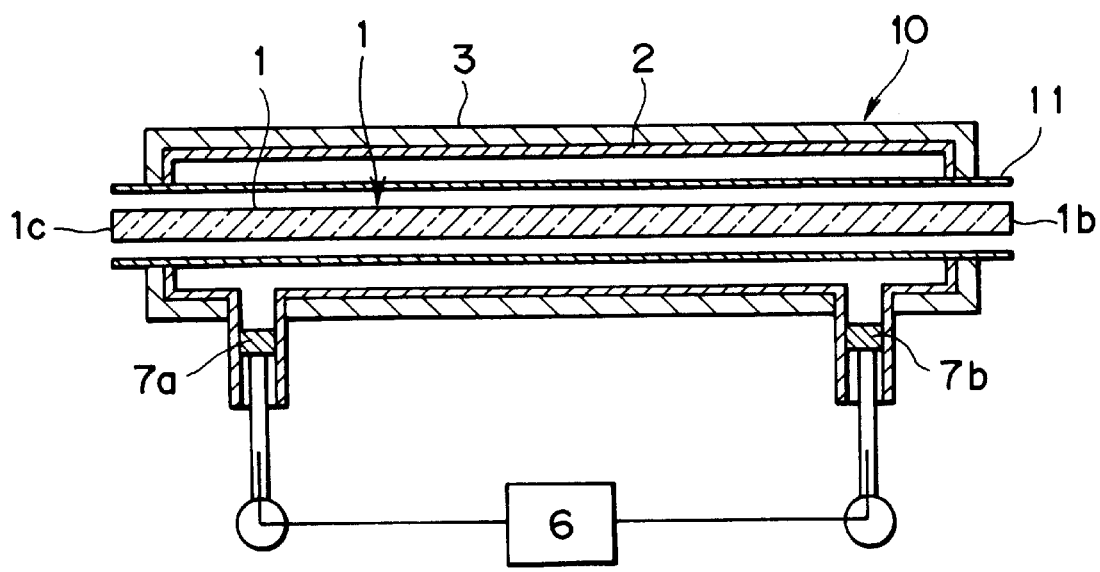

In an embodiment shown in FIG. 2, a tubular transparent pipe 11 is secured by, for example, fuse bonding or by bonding with an adhesive, to the lamp 10 and disposed within the lamp 10. The optical material 1, which may be a rigid or soft solid, a liquid or a gas, is disposed within the pipe 10. In this embodiment, the optical material 1 may be easily exchangeable.

In FIGS. 1–3 and 5, designated as 3 is a reflector surrounding the lamp 10 so that light from the lamp is reflected thereon and enters the optical material 1. The reflector may be a metal layer formed by vacuum deposition of the metal on an outer surface of the lamp 10. The metal may be, for example, aluminum. Instead of vacuum deposition, a metal foil may be used to surround the outer surface of the lamp to form the reflector 3. Alternatively, a metal cylinder having a mirror interior surface may be mounted to cover the lamp 10 for use as the reflector 3. The reflector 3 may be of a type which can reflect light of specific wavelength range. By providing the reflector 3, the light from the lamp can be effectively and efficiently utilized. The reflector 3 provides additional merits that the formation of ozone and damage of human eyes can be prevented.

Figure 4:
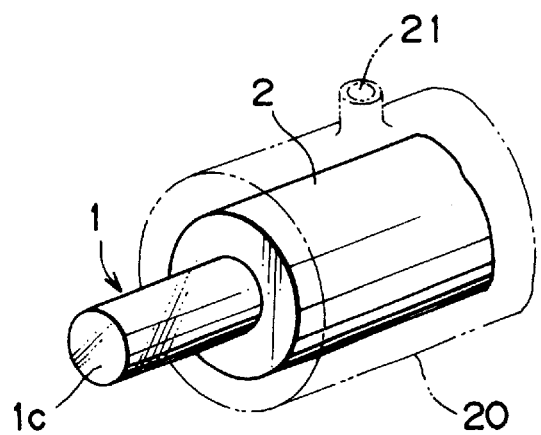
FIG. 4 is a fragmentary perspective view illustrating a further embodiment of a light emitting device according to the present invention.

Referring to FIG. 4, designated as 20 is a jacket surrounding the lamp 10 for cooling the lamp 10 with a cooling medium, such as water or a gas, introduced into and discharged from a space between the jacket 20 and the lamp 10 through an inlet (not shown) and an outlet 21. The provision of the cooling jacket 20 can control the temperature of the lamp 10 and can improve the service life thereof.

Depending upon combinations of the lamp 10 and the optical material 1 used, the light emitting device according to the present invention can be (a) a fluorescent or phosphorescent light emission device, (b) a UV or visible light emission device or (c) a laser beam emission device. These devices will be described next.

(a) Fluorescent or Phosphorescent Emission Device:

In the case of a fluorescent or phosphorescent light emission device, a light transmissive, fluorescent or phosphorescent optical material (phosphor) 1 is used in combination with an excitation lamp 10 so that the optical material 1 emits fluorescent or phosphorescent light upon being excited with the light of the lamp 10. Thus, the fluorescent or phosphorescent light is transmitted to one or both ends of the optical material 1 by total reflection.

In the embodiment illustrated in FIG. 1, the lamp 10 is a discharge lamp having a tubular, transparent, air tight shell 2 in which a discharge gas such as mercury is confined. Designated as 7a and 7b are a pair of cathode and anode electrodes which are electrically connected to a terminal member 6. Thus, when the terminal 6 is connected to a power source, electric current is supplied to the lamp 10 to emit UV light.

Any phosphor may be used as the fluorescent or phosphorescent optical material 1. Examples of the fluorescent or phosphorescent optical materials 1 include quartz glass doped with phosphorus or a rare earth element; glass containing an oxide phosphor such as uranium oxide; crystals or powder of an organic or inorganic phosphor such as $CaWO_4$ or anthracene; and a solution, dispersion, gas or paste containing an organic or inorganic phosphor. As described previously, a phosphor which by itself does not form an elongated body may be contained in a transparent pipe to form the optical material 1. The use of the transparent pipe 11 as shown in FIG. 2 also permits the use of an optical material which by itself cannot form an elongated body or maintain its shape. It is preferred that the optical material 1 have as low absorbance as possible for the light to be emitted so that the attenuance of the light to be emitted can be minimized. An optical fiber having a core having a relatively large refraction index and surrounded by cladding having a relatively small refraction index can be used as the optical material. For example, an optical fiber having a phosphorus-doped quartz core surrounded by cladding may be suitably used.

(b) UV or Visible Light Emission Device

In the case of an ultraviolet and/or visible light emission device, a light transmissive optical material 1 is used in combination with an ultraviolet and/or visible light emitting lamp so that the light of the lamp entering the optical material is transmitted to one or both ends of the optical material 1 by total reflection. The optical material 1 is transparent to the light of the lamp 10.

The ultraviolet and/or visible light emission device has the same construction as that of the fluorescent or phosphorescent emission device (a) above except that the optical material 1 used is transparent to the light of the lamp 10. As the optical material 1, there may be used quartz glass or optical crystals of fluorides such as $CaF_2$ and LiF.

(c) Laser Beam Emission Device

Figure 3:
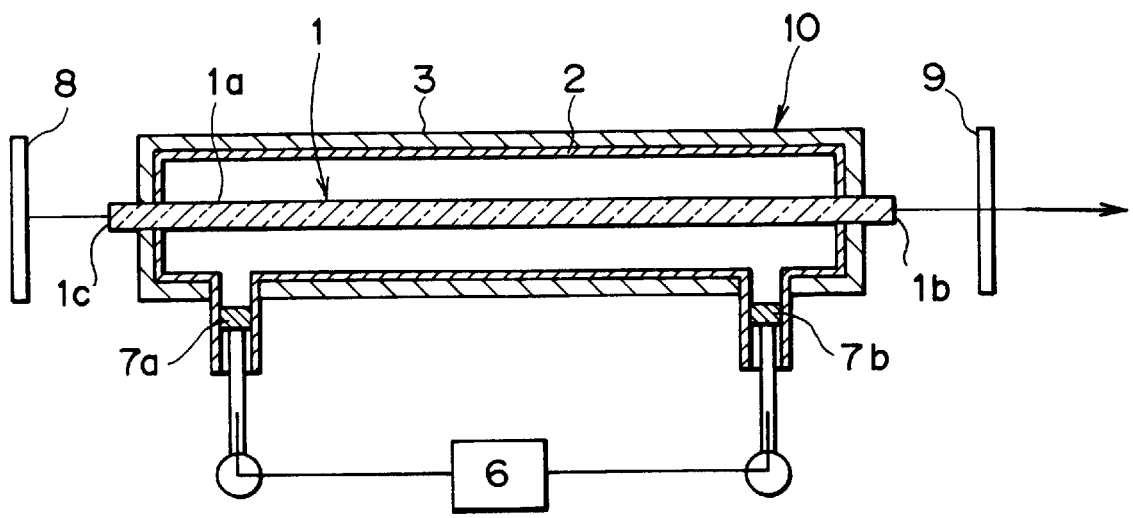

In the case of a laser beam emission device, an elongated, light transmissive, laser generating optical material such as Nd:YAG crystal rod is used in combination with an excitation flash lamp as shown in FIG. 3. A totally reflective mirror 8 and an output mirror 9 are disposed on both ends 1c and 1b of the rod 1, respectively. The optical material 1 emits a laser beam upon being excited with the light of the flash lamp, with the laser beam being transmitted to one end 1b thereof.

The following examples will further illustrate the present invention.

EXAMPLE 1

A fluorescent light emission device having a construction shown in FIG. 1 was prepared. The lamp 10 was a 20 W low pressure mercury lamp having a length 300 mm and an a shell 2 with an outer diameter of 15 mm. A phosphorus-doped quartz glass rod 1 having a length of 350 mm and an outer diameter of 1 mm extended through the lamp 10 and secured to both ends of the shell 2 by fuse bonding. The lamp 10 was accommodated within a stainless steel reflection pipe 3 having a length of 300 mm and an inside diameter of 16 mm. The interior surface of the pipe 3 was polished to have a mirror surface.

When the lamp 10 was put on, the rod 1 emitted fluorescent light with a wavelength of about 350 nm by excitation by UV beams of about 254 nm. Because of a greater refractive index of the quartz glass than that of the discharge gas (mercury vapor) within the lamp, the fluorescent light was efficiently transmitted through the rod 1 by total reflection on the interface between the rod and the gas to both ends of the rod 1. Additionally, since the fluorescent light was hardly absorbed by the rod 1, there was obtained high intensity light at each end of the rod 1. Each of the terminal ends of the rod 1 was polished to minimize the loss of the fluorescent light.

When one end of the rod 1 was covered with a layer of vacuum deposited aluminum, the fluorescent light with a high intensity was emitted from the other end of the rod 1. The light from the other end of the rod 1 was able to be transmitted to a desired location through an optical fiber connected thereto.

EXAMPLE 2

A UV light emission device having a construction shown in FIG. 1 was prepared. Thus, the phosphorus-doped quartz glass rod used in Example 1 was substituted by a synthetic quartz glass rod having a length of 350 mm and an outer diameter of 1 mm. When the lamp 10 was put on, UV rays of 185 nm and 254 nm were transmitted through the rod and emitted from each of the both ends thereof.

EXAMPLE 3

A laser emission device having a construction shown in FIG. 4 was prepared. A krypton excitation flash lamp (output power: 1 kW) having a length of 50 mm and an outer diameter of 12 mm was used as the lamp 10. A Nd:YAG crystal rod 1 having a length of 75 mm and an outer diameter of 3 mm extended through the lamp 10 and secured to both ends thereof by fuse bonding. Designated as 8 was a totally reflective mirror and as 9 was an output mirror. When the crystal rod 1 was excited by the flash lamp 10, a laser beam was emitted from one end of the rod 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A light emitting device comprising:

an elongated lamp defining a central axis and including a first hollow tube concentric with said central axis, containing a gas therein and producing irradiation responsive to electrical input;

an elongated, light transmissive, fluorescent or phosphorescent optical element having at least a portion disposed within said lamp and at least one end extending outside said lamp from an end of said lamp, said central axis extending through said optical element over the entire length of said optical element, said optical element emitting fluorescent or phosphorescent light upon being excited by said irradiation and transmitting said light to said one end; and a transparent second hollow tube sealed to, concentric with and extending through said first tube for supporting said optical element therewithin, said sealed first and second tubes together forming an envelope containing said gas.

2. A light emitting device as claimed in claim 1, further comprising a reflector surrounding said lamp.

3. A light emitting device comprising:

an elongated lamp defining a central axis and including a first hollow tube concentric with said central axis, containing a gas therein, and producing light responsive to electrical input;

an elongated, light transmissive optical element transparent to the light of said lamp and having at least a portion disposed within said lamp and at least one end extending outside said lamp from an end of said lamp, and said central axis extending through said optical element over the entire length of said optical element, said optical element transmitting the light from said lamp to said one end; and a transparent second hollow tube sealed to, concentric with and extending through said first tube for supporting said optical element therewithin, said sealed first and second tubes together forming an envelope containing said gas.

4. A light emitting device as claimed in claim 3, further comprising a reflector surrounding said lamp.

5. A light emitting device comprising:

an elongated lamp defining a central axis and including a first hollow tube concentric with said central axis, containing a gas, and producing excitation light responsive to electrical input;

an elongated, light transmissive, laser generating optical element having at least a portion disposed within said lamp and at least one end extending outside said lamp, from an end of said lamp, said central axis extending through said optical element over the entire length of said optical element, and said optical element emitting a laser beam responsive to said excitation light and transmitting the laser beam to said one end; and a transparent second hollow tube sealed to, concentric with and extending through said first tube for supporting said optical element therewithin, said sealed first and second tubes together forming an envelope containing said gas.

6. A light emitting device as claimed in claim 5, further comprising a reflector surrounding said lamp.

7. A light emitting device as claimed in claim 1 wherein, said central axis, said lamp and said optical element are straight.

8. A light emitting device as claimed in claim 3 wherein, said central axis, said lamp and said optical element are straight.

9. A light emitting device as claimed in claim 5 wherein, said central axis, said lamp and said optical element are straight.

* * * * *